United States Patent
Suurmond

(10) Patent No.: US 6,497,662 B2
(45) Date of Patent: Dec. 24, 2002

(54) RENDERING OF A MULTI-DIMENSIONAL OBJECT DATA SET

(75) Inventor: Rudolf Theodoor Suurmond, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/954,642

(22) Filed: Sep. 18, 2001

(65) Prior Publication Data

US 2002/0052549 A1 May 2, 2002

(30) Foreign Application Priority Data

Sep. 21, 2000 (EP) .............................. 00203286

(51) Int. Cl.$^7$ ................................. A61B 8/00
(52) U.S. Cl. ...................... 600/437; 600/455; 600/443; 345/418
(58) Field of Search ................ 600/443, 446, 600/447, 449, 448, 444, 454, 455; 128/916; 382/154; 345/418, 419, 424

(56) References Cited

U.S. PATENT DOCUMENTS 5,911,691 A * 6/1999 Mochizuki et al. ......... 128/916
6,106,465 A * 8/2000 Napolitano et al. ......... 600/443
6,341,174 B1 * 1/2002 Callahan et al. ............ 382/154
6,346,124 B1 * 2/2002 Geiser et al. ............... 600/450

FOREIGN PATENT DOCUMENTS

EP 0055812 9/2000 ............ G06T/15/40

OTHER PUBLICATIONS

"Virtual Endoscopy Using Surface Rendering and Perspective Volume Rendering" D.P. Jang et al, Medicine Meets Virtual Reality Conference, Jan. 20, 1999, p. 161–166.

* cited by examiner

*Primary Examiner*—Francis J. Jaworski
*Assistant Examiner*—Maulin Patel
(74) *Attorney, Agent, or Firm*—John Vodopia

(57) ABSTRACT

A rendering system includes a rendering unit (2) and a data processing unit (1) for the processing of a multi-dimensional object data set. The data processing unit is arranged to sample a surface model of the object data set. The successive representations of the surface model from the respective viewing directions are shown on the rendering unit. For the last viewing direction indicated, that is, the final direction, the representation of the multi-dimensional object data set is shown as viewed from the final direction.

9 Claims, 2 Drawing Sheets

RENDERING OF A MULTI-DIMENSIONAL OBJECT DATA SET

Figure 1:
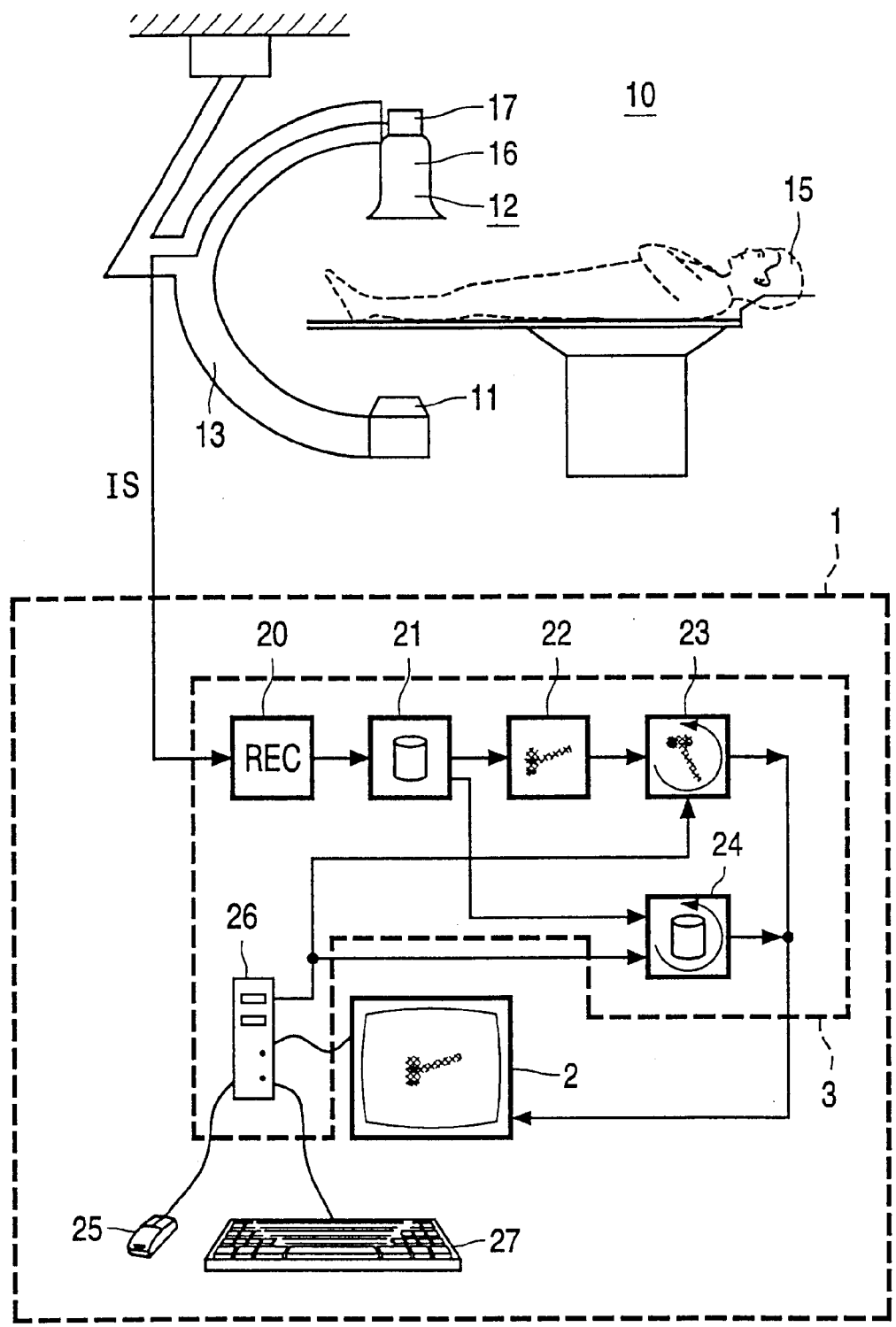

The present patent application relates to the formation of a variety of visual renderings of an object data set. Such an object data set relates to actual data of an object to be examined. For example, the object is a patient to be medically examined. The object data set contains, for example, density values, a temperature distribution, the local magnetization or flow data. Other applications are also feasible, for example, applications involving hydrodynamic data or meteorological data, such as flow data, or seismic or medical diagnostic density values.

The invention relates to a rendering system with a rendering unit and a data processing unit for the processing of a multi-dimensional object data set, wherein
- the object data set associates data values with positions in a multi-dimensional space, and
- the data processing unit is arranged
  - to sample a surface model in the multi-dimensional object data set, which surface model contains positions on a predetermined surface in the multi-dimensional space.

A rendering system of this kind is known from U.S. Pat. No. 5,782,762.

The known rendering system is designed especially for visualizing the inner side of a hollow lumen, such as the intestine of a patient to be examined, on the basis of computed tomography data. The known system forms a volume file of data values by stacking a series of computed tomography images, each of which relates to a cross-section of the patient to be examined. The volume file is a data set which associates the tomographic data values with positions in the three-dimensional geometrical space. The known rendering system segments a region of interest from the volume file on the basis of comparison of the data values with a predetermined threshold value. In the region of interest an isosurface of the hollow lumen is determined, said isosurface being subjected to rendering, thus forming a view of the wall of the hollow lumen from inside the hollow lumen. Such an isosurface is a two-dimensional surface in the three-dimensional space of positions having each time the same data values. The known rendering system utilizes a so-called "wireframe model" of the isosurface so as to derive the rendering of the inner wall of the hollow lumen from the volume file. The known rendering system is alternatively capable of forming a coarse rendering of the inner wall by shading or coloring the polygons of the wireframe model. This coarse rendering is used, for example in the case of a quickly changing point of view from within the hollow lumen, thus creating the impression that the observer moves inside the hollow lumen while looking around at the interior wall.

The cited United States patent also deals with increasing the speed at which rendering is executed. To this end, in conformity with the cited document it is necessary to reduce the volume file. As alternatives for such a reduction the article mentions a reduction of the number of bits/pixel in the computed tomography images from 16 bits/pixel to 8 bits/pixel, a selection of a smaller sub-volume from the volume file and a reduction of the spatial resolution of the volume file, composed of 500 computed tomography images, from 512×512×500 voxels to 256×256×500 voxels. It is also proposed to reduce the sampling of the computed tomography images.

When the known rendering system increases the speed at which the inside of the hollow lumen is rendered from successive points of view, the diagnostic quality of the image is degraded. The diagnostic quality is degraded notably because use is made of the wireframe module with the polygons shaded therein and because a significant reduction of the volume file is required. Moreover, the operation of the known rendering system is rather laborious, because a new isosurface is derived for each new view of the interior wall of the hollow lumen from a given direction.

It is an object of the invention to provide a rendering system that enables rendering of the object data set with a high diagnostic quality from different directions.

This object is achieved by means of a rendering system which is arranged in accordance with the invention so as to
- derive successive representations of the surface model while viewing from respective directions of view in a range between a starting direction and a final direction,
- successively render on the rendering unit the successive representations of the surface model from the respective directions of view,
- derive a representation of the multi-dimensional object data set while viewing from the final direction, and subsequently
- to render on the rendering unit the representation of the multi-dimensional object data set while viewing from the final direction.

In conformity with the invention the rendering system samples a surface model of the object data set that can be used for a plurality of renderings. The surface model represents a part of the object data set on a surface in the multi-dimensional space. The surface model in practice represents a surface of the object to be examined. For example, the surface model is an isosurface in the object data set. The rendering system successively shows renderings of the surface model as viewed from different directions. These renderings of the surface model, for example, are checked by the user who utilizes a control member such as a mouse. The user can thus rotate and/or shift the surface model as if it were on the rendering unit. The surface model comprises a quantity of data values which is much smaller than that of the multi-dimensional data set. This is because the surface model concerns a less-dimensional space in comparison with the object data set. Consequently, a next rendering can be very quickly ready for display on the rendering unit. This can even take place at approximately the same speed as that at which the user issues a command to render from each time a new direction of view. In practice the user can issue new commands very quickly, for example by moving the mouse, each position of the mouse corresponding to a new direction of view wherefrom the surface model is to be rendered. It is thus avoided that the rendering annoyingly lags the commands issued by the user. For the last direction of view entered by the user, that is, the final direction, the rendering system provides a representation of the (complete) object data set, so not only of the surface model. For example, the final direction is determined by the position where the user keeps the control member, such as the mouse, still. For example, the user can indicate a section through the object data set or given positions in the object data set in the representation of the object data set from the final direction. The invention makes it very easy for the user to rotate or shift the rendering of the object data set merely by showing the surface model in a different orientation. As soon as the user indicates the final direction, the complete object data set is automatically rendered in the orientation from the final direction.

These and other aspects of the invention will be described in detail with reference to the following embodiments that are defined in the dependent claims.

A suitable representation of the surface model consists of a collection of polygons having vertices formed by the positions on the relevant surface in the multi-dimensional space. A polygon model of this kind requires only few data for adequate representation of the surface. Moreover, such a polygon model can be readily manipulated by the data processing unit.

An advantageous embodiment of the rendering system selects the object data set from a larger multi-dimensional basic data set. This embodiment is suitable, for example for use in contrast angiography. It makes the rendering system in accordance with the invention particularly suitable for use as a medical diagnostic workstation. In contrast angiography computed tomography or rotational radiology is used to form profiles or projection images of a part of the patient to be examined while blood vessels are filled with a contrast agent, that is, from different projection directions. The multi-dimensional basic data set is reconstructed from said profiles or projection images. The multi-dimensional basic data set can also be reconstructed from magnetic resonance signals. The multi-dimensional data set comprises a representation of a part of the vascular system in the surrounding tissue of the patient to be examined. Segmentation enables accurate separation of the object data set from the basic data set, the object data set relating to the vascular system of the patient to be examined.

The rendering system is preferably arranged to perform the segmentation on the basis of a histogram which represents the distribution of data values in the basic data set.

This histogram very clearly shows which range of data values is suitable for the segmentation of the data values of the object data set from the basic data set. It is notably easy to select a suitable threshold value for the segmentation from the histogram. It is particularly handy to show the histogram on the rendering unit and to indicate the threshold value in the rendering of the histogram by means of the control member, for example, the mouse.

A further advantageous embodiment of the rendering system stores the surface model, for example the polygon model, in a Virtual Reality Modeling Language (VRML) format. The surface model can thus be readily exchanged between users. For example, the surface model can be observed in a web browser and it can also be dispatched by e-mail. In this way it is not necessary for different users to sample the surface model each time again.

The invention also relates to a method of processing multi-dimensional object data set. The method according to the invention is defined in claim 8. The method according to the invention enables rendering of the object data set with a high image quality from different directions and renderings from successive directions are achieved at a high rate.

The invention further relates to a computer program as claimed in claim 9. When the computer program of the invention is loaded into a general purpose computer, the computer is enabled to carry out the method of the invention as claimed in claim 8. The computer program of the invention may be supplied on a data carrier such as a CD-rom or the computer program may be downloaded via a data network such as the 'world-wide web'.

Figure 2:
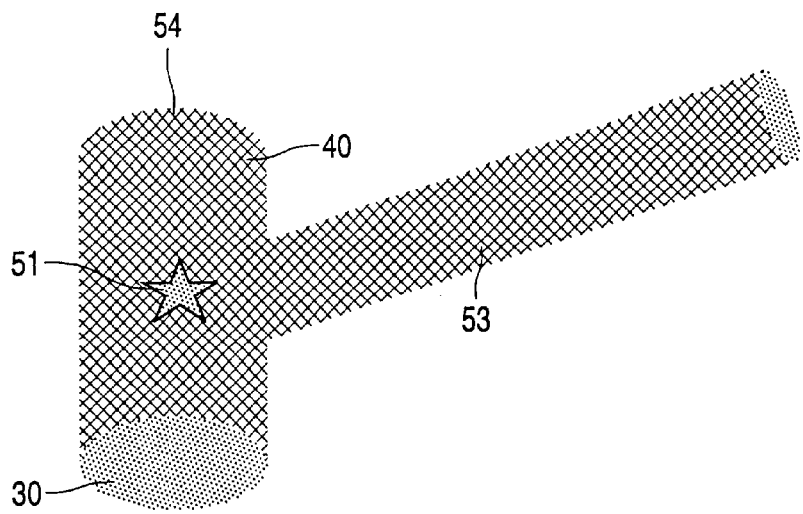
Figure 3:
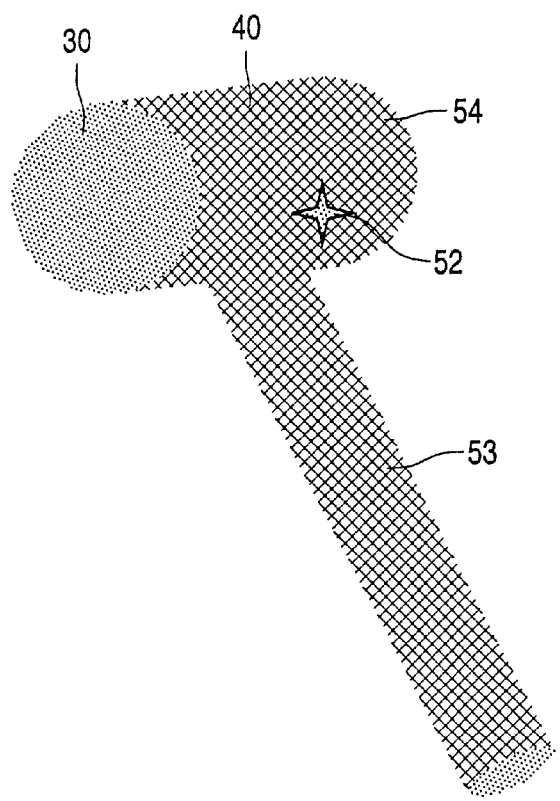

These and other aspects of the invention will be elucidated hereinafter, by way of example, on the basis of the following embodiments and with reference to the accompanying drawing; therein:

FIG. 1 shows diagrammatically an X-ray examination apparatus whereto a rendering system in accordance with the invention is connected, FIG. 2 shows a rendering of the object data set in a first orientation, that is, the starting direction, and FIG. 3 shows a rendering of the object data set in a second orientation, that is, the final direction.

FIG. 1 shows diagrammatically an X-ray examination apparatus whereto a rendering system in accordance with the invention is connected. The X-ray examination apparatus 10 includes an X-ray source 11 and an X-ray detector 12, for example an X-ray image intensifier with a camera; these components are mounted at respective ends of a C-arm support 13. The C-arm support 13 is suspended from a vertical support 14. The C-arm carrier 13 is suspended in such a manner that the C-arm support enables the X-ray source and the X-ray detector to be rotated about a patient 15 to be examined. The patient to be examined can thus be irradiated by an X-ray beam from different directions. A series of projection images of a part of the patient to be examined is thus formed from different projection directions. The X-ray detector notably delivers electronic image signals which represent said projection images. For example, the X-ray detector includes an X-ray image intensifier 16 with a camera 17. The X-ray image intensifier derives light images on the exit window from the X-ray images formed on the entrance window. The camera 17 picks up said light images and the electronic image signals are derived from the light images.

The rendering system 1 in accordance with the invention is connected to the X-ray examination apparatus 10. The electronic image signals (IS) are applied to a reconstruction unit 20. The reconstruction unit 20 derives a three-dimensional volume reconstruction of the interior of the imaged part of the patient to be examined from the projection images represented by the electronic image signals (IS). The reconstruction unit notably executes a so-called cone beam reconstruction as is known per se from the article "A cone-beam reconstruction algorithm for circle-plus-arc data acquisition geometry" by X Wang and R. Ning in IEEE Trans. Med. Imag. 18(1999), pp. 815 to 824. The volume reconstruction yields the basic data set which is stored in a basic memory 21. The object data set is derived from said basic data set, for example by segmentation. When the invention is used in angiography, the object data set concerns, for example a part of the vascular system of the patient to be examined. During the angiographic examination contrast agent is injected into an artery of the patient to be examined and X-ray images are acquired from different directions of a part of the patient to be examined which contains the arteries filled with contrast agent. The basic data set is reconstructed from such X-ray images. In this application the data values are formed by local density values which are represented by the local X-ray absorption. The density values in the blood vessels filled with the contrast agent deviate significantly from such values outside the blood vessels. As a result, the object data set, representing the vascular system of the patient to be examined in the present application, can be readily derived from the basic data set by segmentation. The rendering system in accordance with the invention includes a segmentation unit 22 for forming the object data set. The surface model is derived from the object data set by means of a selection unit 23. For example, the surface model consists of a set of polygons, for example, triangles whose vertices represent positions that are situated on the surface of the segmented part, in this case being the vascular system of the patient to be examined.

The user of the display system can manipulate the object data set in the basic memory and the surface model in the selection unit. The user can notably view the object data set and the surface model from different orientations. The user can control the manipulations by means of the control member 25 which is in this case formed by a mouse which is connected to a system processor 26. The user can also enter commands via a keyboard 27 so as to control the manipulations. The system processor 26 controls one or more video processors on the basis of the motions of the mouse, so that the rendering dictated by the user is formed by the rendering unit 2. The video processor 23 notably forms successive renderings from different orientations of the surface model. Another video processor 24 forms renderings of the object data set with different orientations. The rendering system in accordance with the invention shows only the instantaneous orientation of the surface model during motion of the mouse. When the mouse is kept still, the rendering system shows the orientation of the object data set that corresponds to the relevant position of the mouse.

FIG. 2 shows a rendering of the object data set in a first orientation, being the starting direction, and FIG. 3 shows a rendering of the object data set in a second orientation, that is, the final direction. A part of the vascular system is shown by way of example. This part is notably a part of the vascular system in which a secondary vessel 53 branches off from a main vessel 54. The surface model 40 is a set of polygons. The FIGS. 2 and 3 show the object data set, that is, the interior of the object data set 30 with the surface model 40 in the respective orientations when the mouse 25 is kept still. When the mouse is moved, the rendering system shows only the surface model in the orientation that is associated with the instantaneous position of the mouse. The various renderings are very handy, for example, for indicating different positions on the surface model. For example, the position 51 can be readily indicated in the orientation of FIG. 2. In FIG. 3 the position 51 is obscured from view by the rendering of the part 53 of the vascular system. In FIG. 3, however, it is very easy indicate the position 52 that is obscured from view in FIG. 2. On the basis of the positions in the renderings and the orientations of the renderings the system processor 26 calculates the positions in the object data set of the indicated positions on the surface model. The calculated positions in the object data set can be used, for example to calculate the line through the two positions. For example, it is also possible to indicate a third position 53 and to calculate the plane through the three positions in the object data set. This plane can be used, for example, as a cutting plane for rendering the interior of the object data set as viewed from the cutting plane.

What is claimed is:

1. A rendering system with a rendering unit and a data processing unit for the processing of a multi-dimensional object data set, wherein
   the object data set associates data values with positions in a multi-dimensional space, and
   the data processing unit is arranged to
      sample a surface model in the multi-dimensional object data set, which surface model contains positions on a predetermined surface in the multi-dimensional space,
      derive successive representations of the surface model, each representation depicting the surface model from a different direction of view in a range between a starting direction and a final direction,
      successively render on the rendering unit the successive representations of the surface model from the respective directions of view,
      derive a representation of the multi-dimensional object data depicting the object from the final direction, and subsequently
      render on the rendering unit the representation of the multi-dimensional object data set from the final direction.

2. A rendering system as claimed in claim 1, wherein the data processing unit is arranged to form the surface model as a set of polygons whose vertices are positions on the preselected surface.

3. A rendering system as claimed in claim 1, wherein the data processing unit is arranged to derive the multi-dimensional object data set from a larger multi-dimensional basic data set.

4. A rendering system as claimed in claim 3, wherein the data processing unit is arranged to derive the multi-dimensional object data set from the multi-dimensional basic data set by segmentation.

5. A rendering system as claimed in claim 4, wherein the data processing unit is arranged to execute the segmentation on the basis of the distribution of data values in the multi-dimensional basic data set.

6. A rendering system as claimed in claim 1, wherein the data processing unit is arranged to store the surface model in a predetermined standard format, notably in a VRML format.

7. A rendering system as claimed in claim 1, including a control member which is arranged
   to indicate a first position in the multi-dimensional object data set in the starting direction, and
   to indicate a second position in the multi-dimensional object data set in the final direction,
   the rendering system being arranged to derive respective representations of the object data set while viewing from the initial starting direction and while viewing from the final direction, and to render these representations on the rendering unit.

8. A method of processing multi-dimensional object data set, wherein
   the object data set associates data values with positions in a multi-dimensional space and the method comprises the steps of
      sampling a surface model in the multi-dimensional object data set, which surface model contains positions on a predetermined surface in the multi-dimensional space,
      deriving successive representations of the surface model, each representation depicting the surface model from a different direction of view in a range between a starting direction and a final direction,
      successively rendering the successive representations of the surface model from the respective directions of view and
      subsequently rendering a representation of the multi-dimensional object data set from the final direction.

9. A computer program comprising instructions for sampling a Surface model in a multi-dimensional object data set, which surface model contains positions on a predetermined surface in a multi-dimensional space,
   deriving successive representations of the surface model, each representation depicting the surface model from a different direction of view in a range between a starting direction and a final direction.
   successively rendering, the successive representations of the surface model from the respective directions of view and
   subsequently rendering a representation of the multi-dimensional object data set from the final direction.

* * * * *